(12) United States Patent
Akiba (10) Patent No.: US 7,712,982 B2
(45) Date of Patent: May 11, 2010

(54) ACTUATOR

(75) Inventor: Toshikatsu Akiba, Kisarazu (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 233 days.

(21) Appl. No.: 12/046,026

(22) Filed: Mar. 11, 2008

(65) Prior Publication Data

US 2008/0240706 A1 Oct. 2, 2008

(30) Foreign Application Priority Data

Mar. 28, 2007 (JP) .............................. 2007-084285

(51) Int. Cl.
*G03B 17/00* (2006.01)
*H02K 7/09* (2006.01)
*G03H 1/00* (2006.01)
*H02K 1/06* (2006.01)
*H02K 21/12* (2006.01)

(52) U.S. Cl. ............... 396/428; 310/90.5; 310/216.021; 310/216.022; 310/156.38; 310/156.45; 359/30

(58) Field of Classification Search .................. 396/428; 310/216, 218, 216.001, 216.111, 216.112, 310/38, 90.5, 216.021, 216.022, 158.38, 310/156.45; 359/30

See application file for complete search history.

(56) References Cited

U.S. PATENT DOCUMENTS

| 4,719,381 | A | * | 1/1988 | Miles | ........................... 310/166 |
| 4,947,067 | A | * | 8/1990 | Habermann et al. | ........... 310/51 |
| 6,384,500 | B1 | * | 5/2002 | Chassoulier et al. | ....... 310/90.5 |
| 6,909,205 | B2 | * | 6/2005 | Corcoran et al. | ......... 310/12.14 |
| 7,112,903 | B1 | * | 9/2006 | Schob | ....................... 310/90.5 |

FOREIGN PATENT DOCUMENTS

| JP | 06-284673 | 10/1994 |
| JP | 2003-324936 | 11/2003 |

* cited by examiner

*Primary Examiner*—W. B. Perkey
*Assistant Examiner*—Noam Reisner
(74) *Attorney, Agent, or Firm*—Turocy & Watson, LLP (57) ABSTRACT

An actuator includes a rotor, a stator containing the rotor, and a bearing to support the rotor to be rotatable with respect to the stator about the central axis of the rotor and an axis perpendicular to the central axis. The rotor includes rotor central magnetic poles, a rotor upper magnetic pole, and a rotor lower magnetic pole. The stator includes stator central magnetic poles larger in number than the rotor central magnetic poles, stator upper magnetic poles, stator lower magnetic poles, central coils to appropriately magnetize the stator central magnetic poles, upper coils to appropriately magnetize the stator upper magnetic poles, and lower coils to appropriately magnetize the stator lower magnetic poles. The length of each stator central magnetic pole along a central axis of the stator is larger than a length of each rotor central magnetic pole along the central axis of the rotor.

7 Claims, 6 Drawing Sheets

ACTUATOR

CROSS-REFERENCE TO RELATED APPLICATIONS

This application is based upon and claims the benefit of priority from prior Japanese Patent Application No. 2007-084285, filed Mar. 28, 2007, the entire contents of which are incorporated herein by reference.

BACKGROUND OF THE INVENTION

1. Field of the Invention

The present invention relates to an actuator capable of rotational driving with a multiple-degree freedom.

2. Description of the Related Art

Conventionally, as a multiple-degree-freedom rotational driving mechanism employed for visual line change control of a monitor camera or the like, a spherical actuator and the like are proposed. According to one spherical actuator (JP-A 6-284673 (KOKAI)), motors similar to so-called brushless DC servo motors are combined to enable rotational driving with a multiple-degree freedom. According to another a spherical actuator (JP-A 2003-324936 (KOKAI)), a permanent magnet is arranged on a cap-like rotor and multiple-degree-freedom driving is implemented by employing an electromagnetic motor.

These conventional structures are not necessarily satisfactory because they have the following problems. For example, in rotational driving about the central axis of the rotor, positioning is effected intermittently at every 90°. Upon performing rotational driving about an axis perpendicular to the central axis of the rotor, rotational driving about the central axis of the rotor is difficult. Particularly, concerning rotor rotation, it is difficult to position the rotor accurately at an arbitrary position.

BRIEF SUMMARY OF THE INVENTION

An actuator according to the present invention comprises a rotor having a rotationally symmetric outer shape, a stator having a rotationally symmetric space to contain the rotor, and a bearing that is arranged between the rotor and the stator to support the rotor to be rotatable with respect to the stator about the central axis of the rotor and an axis perpendicular to the central axis. The outer shape of the rotor partially includes a first spherical surface, and the space of the stator has a boundary partially including a second spherical surface concentric with the first spherical surface. The rotor includes magnetized rotor central magnetic poles arranged along a circumference formed when a plane extending through a center of the first spherical surface and perpendicular to a central axis of the rotor intersects the first spherical surface, a magnetized rotor upper magnetic pole arranged along and above the rotor central magnetic poles, and a magnetized rotor lower magnetic pole arranged along and below the rotor central magnetic poles. The rotor central magnetic poles, rotor upper magnetic pole, and rotor lower magnetic pole have outer surfaces arranged on the first spherical surface. The stator includes stator central magnetic poles that are arranged around the rotor to oppose the rotor central magnetic pole and larger in number than the rotor central magnetic poles, at least three stator upper magnetic poles arranged above the rotor central magnetic poles, at least three stator lower magnetic poles arranged below the rotor central magnetic poles, central coils to appropriately magnetize the stator central magnetic poles, upper coils to appropriately magne-tize the stator upper magnetic poles, and lower coils to appropriately magnetize the stator lower magnetic poles. The stator central magnetic poles, stator upper magnetic poles, and stator lower magnetic poles have inner surfaces arranged on the second spherical surface. The length of each stator central magnetic pole along a central axis of the stator is larger than a length of each rotor central magnetic pole along the central axis of the rotor. The open angle of two straight lines drawn from a center of the first spherical surface to an upper end of each stator upper magnetic pole and a lower end of a corresponding stator lower magnetic pole is larger than an open angle of two straight lines drawn from the center of the first spherical surface to an upper end of each rotor upper magnetic pole and a lower end of a corresponding rotor lower magnetic pole, and the open angle of two straight lines drawn from the center of the first spherical surface to a lower end of each stator upper magnetic pole and an upper end of a corresponding stator lower magnetic pole is larger than an open angle of two straight lines drawn from the center of the first spherical surface to a lower end of each rotor upper magnetic pole and an upper end of a corresponding rotor lower magnetic pole.

DETAILED DESCRIPTION OF THE INVENTION

First Embodiment

The arrangement of an actuator according to the first embodiment will be described with reference to FIGS. 1 to 4.

An actuator 100 of this embodiment includes a rotor 110 with a rotationally symmetric outer shape, a stator 130 having a rotationally symmetric space to contain the rotor 110, and a bearing 160, which is provided between the rotor 110 and stator 130, supporting the rotor 110 so as to allow it to rotate with respect to the stator 130 about the central axis of the rotor 110 and an axis perpendicular to the central axis.

The rotor 110 has a rotor body 111, six magnetized rotor central magnetic poles 121, magnetized rotor upper magnetic poles 122 corresponding in number to the rotor central magnetic poles 121, and magnetic rotor lower magnetic poles 123 corresponding in number to the rotor central magnetic poles 121.

The rotor body 111 has a spherical band-like outer surface 112 formed of part of a spherical surface sandwiched by two parallel planes that are generally equidistant from the center of the spherical surface and intersect the spherical surface.

Figure 3:
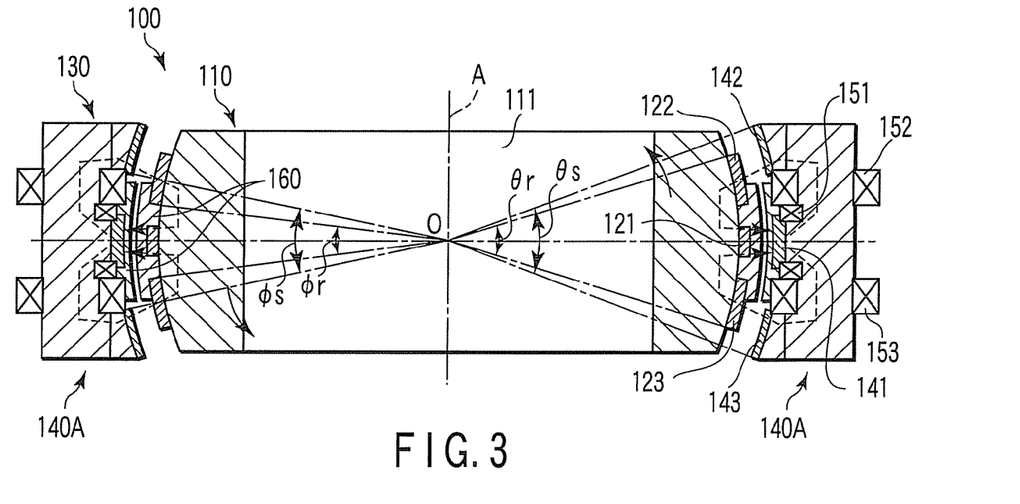
FIG. 3 is a schematic longitudinal sectional view of the actuator in FIG. 1.

The rotor body 111 also has a through hole 113 extending along the central axis of the rotor 110.

Figure 1:
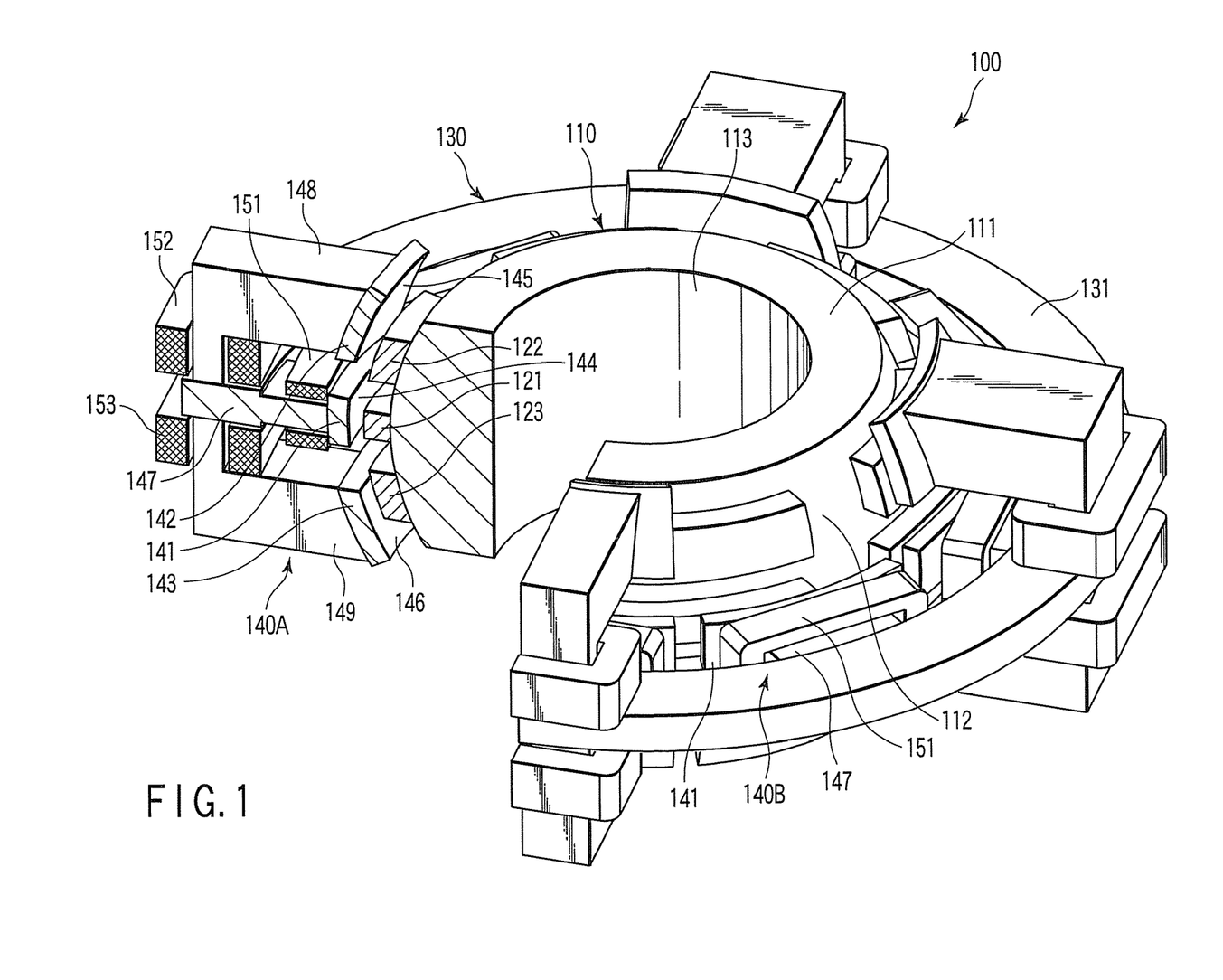
FIG. 1 is a perspective view of an actuator according to the first embodiment.
Figure 2:
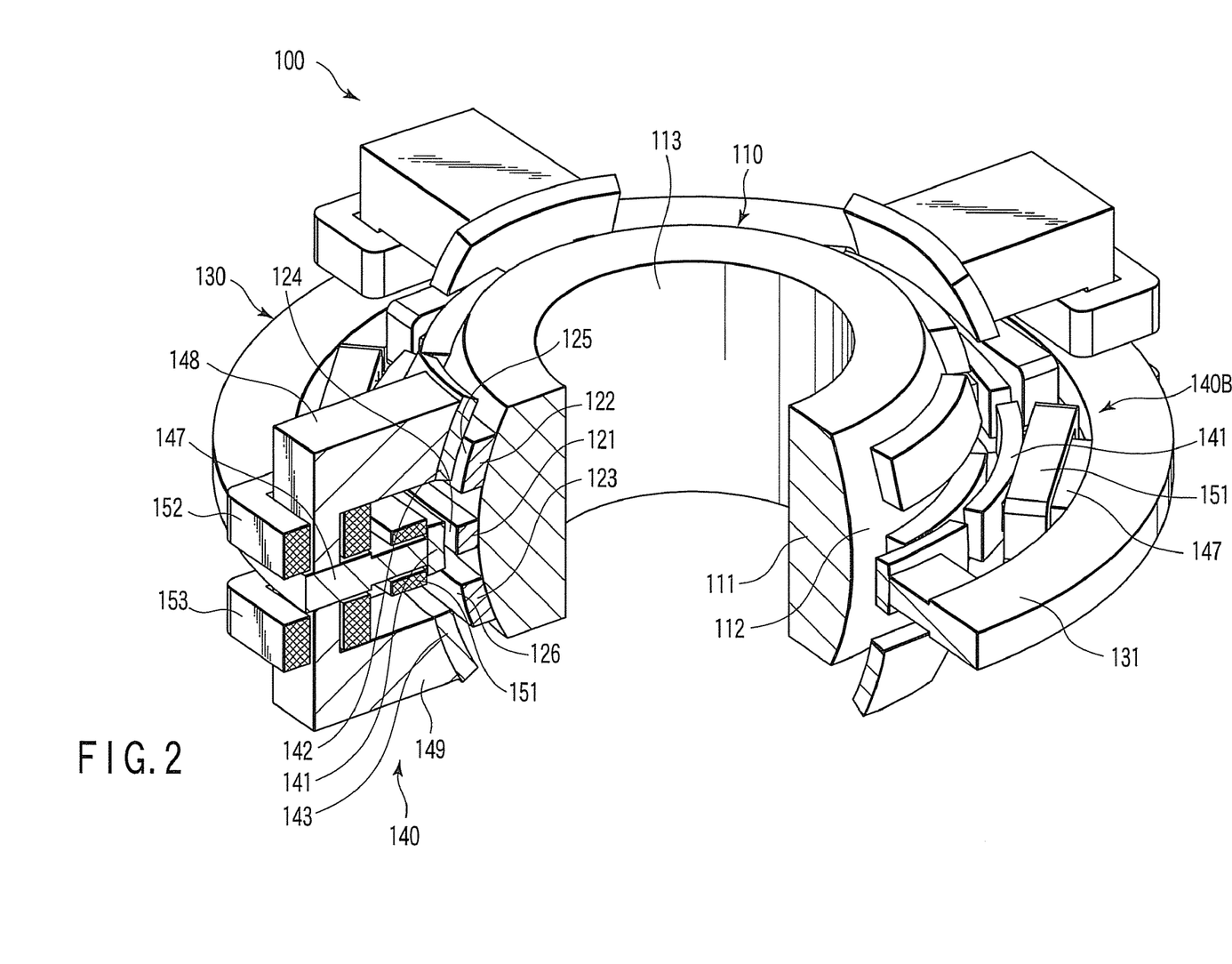
FIG. 2 is a perspective view of the actuator in FIG. 1 as viewed from an angle different from that in FIG. 1.

The rotor central magnetic poles 121 are arranged on the outer surface 112 of the rotor body 111 along a circumference formed when a plane extending through the center of the outer surface 112 and perpendicular to a central axis A of the rotor 110 intersects the outer surface 112 of the rotor body 111. In other words, the rotor central magnetic poles 121 are arranged along a large circle (a circle appearing on the section of a spherical surface when cutting the spherical surface with a plane extending through its center) located on the plane perpendicular to the central axis A of the rotor 110. The rotor upper magnetic poles 122 are arranged on the outer surface 112 of the rotor body 111, along and above the rotor central magnetic poles 121. The rotor lower magnetic poles 123 are arranged on the outer surface 112 of the rotor body 111, along and below the rotor central magnetic poles 121. The upper side and lower side respectively refer to one side and the other side of the center of the rotor 110 as the reference along the central axis A of the rotor 110. The rotor upper magnetic poles 122 and rotor lower magnetic poles 123 align with the rotor central magnetic poles 121 along the central axis A of the rotor 110.

As shown in FIG. 2, the rotor central magnetic poles 121, rotor upper magnetic poles 122, and rotor lower magnetic poles 123 respectively have spherical surfaces 124, 125, and 126 as their outer surfaces. Each of the spherical surfaces 124, 125, and 126 is formed of part of a spherical surface concentric with the spherical band-like outer surface 112.

In this embodiment, the outer surface 112 of the rotor body 111 forms a spherical band. However, the shape of the outer surface 112 is not limited to this. The rotor central magnetic poles 121, rotor upper magnetic poles 122, and rotor lower magnetic poles 123 may have concentric spherical surfaces 124, 125, and 126 so that the rotor 110 partly has a spherical surface. For example, the outer surface 112 of the rotor body 111 may form a cylindrical surface.

As shown in FIGS. 1 and 2, the stator 130 includes a ring-like frame 131 surrounding the rotor 110, and four magnetic pole units 140A and four magnetic pole units 140B fixed to the frame 131. The magnetic pole units 140A and magnetic pole units 140B are alternately arranged equiangularly.

Each magnetic pole unit 140A includes a stator central magnetic pole 141, a stator upper magnetic pole 142 arranged above the stator central magnetic pole 141, a stator lower magnetic pole 143 arranged below the stator central magnetic pole 141, a central coil 151 to appropriately magnetize the stator central magnetic pole 141, an upper coil 152 to appropriately magnetize the stator upper magnetic pole 142, and a lower coil 153 to appropriately magnetize the stator lower magnetic pole 143. The upper side and lower side respectively refer to one side and the other side of the center of the stator 130 as the reference along a central axis A of the stator 130, in the same manner as the case of the rotor. The stator upper magnetic pole 142 and stator lower magnetic pole 143 align with the stator central magnetic pole 141 along the central axis A of the stator 130. Each magnetic pole unit 140B includes a stator central magnetic pole 141 and a central coil 151 to appropriately magnetize the stator central magnetic pole 141. The stator central magnetic poles 141 are arranged around the rotor 110 to oppose the rotor central magnetic poles 121. Each stator central magnetic pole 141 and each central coil 151 are attached to the frame 131 by a support member 147. Each stator upper magnet pole 142 and each upper coil 152 are attached to the frame 131 by a support member 148. Each stator lower magnetic pole 143 and each lower coil 153 are attached to the frame 131 by a support member 149.

As shown in FIG. 1, the stator central magnetic pole 141, stator upper magnetic pole 142, and stator lower magnetic pole 143 respectively have a spherical surface 144, a spherical surface 145, and a spherical surface 146 as inner surfaces. Each of the spherical surfaces 144, 145, and 146 is formed of part of a spherical surface concentric with the spherical band-like outer surface 112 of the rotor 110. The spherical surfaces 144, spherical surfaces 145, and spherical surfaces 146 define a rotationally symmetric space to contain the rotor 110. The rotationally symmetric space has a boundary including the spherical surfaces 144, 145, and 146.

As shown in FIG. 3, the length of the stator central magnetic pole 141 along the central axis A of the stator 130 is larger than that of the rotor central magnetic pole 121 along the central axis of the rotor 110. Consequently, the upper and lower ends of the rotor central magnetic pole 121 are located inside two straight lines drawn from a center O of the rotor 110 to the upper and lower ends of the stator central magnetic pole 141. An open angle θs of the two straight lines drawn from the center O of the rotor 110 to the upper end of the stator upper magnetic pole 142 and the lower end of the stator lower magnetic pole 143 is larger than an open angle θr of two straight lines drawn from the center O of the rotor 110 to the upper end of the rotor upper magnetic pole 122 and the lower end of the rotor lower magnetic pole 123.

Consequently, the upper end of the rotor upper magnetic pole 122 is located below the straight line drawn from the center O of the rotor 110 to the upper end of the stator upper magnetic pole 142, and the lower end of the rotor lower magnetic pole 123 is located above the straight line drawn from the center O of the rotor 110 to the lower end of the stator lower magnetic pole 143. Also, an open angle φs of two straight lines drawn from the center O of the rotor 110 to the lower end of the stator upper magnetic pole 142 and the upper end of the stator lower magnetic pole 143 is larger than an open angle φr of two straight lines drawn from the center O of the rotor 110 to the lower end of the rotor upper magnetic pole 122 and the upper end of the rotor lower magnetic pole 123. Consequently, the lower end of the rotor upper magnetic pole 122 is located below the straight line drawn from the center O of the rotor 110 to the lower end of the stator upper magnetic pole 142, and the upper end of the rotor lower magnetic pole 123 is located above the straight line drawn from the center O of the rotor 110 to the upper end of the stator lower magnetic pole 143.

Figure 4:
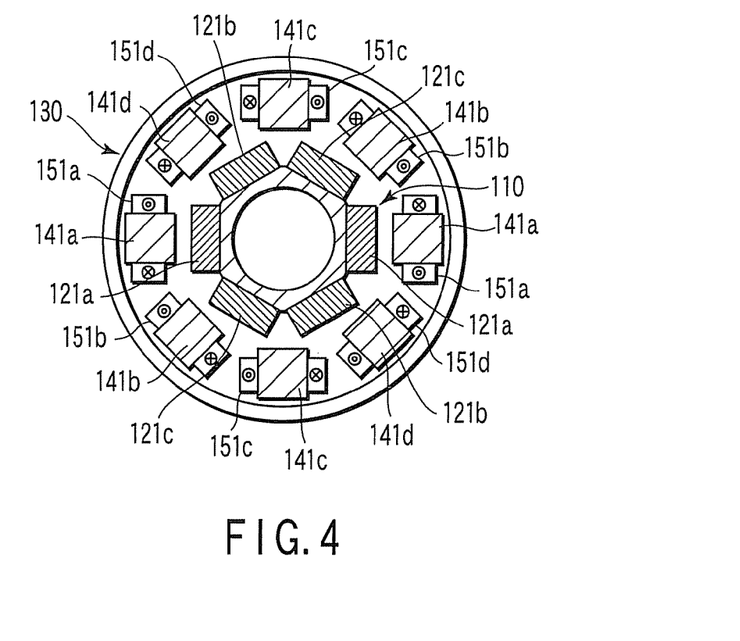
FIG. 4 is a schematic cross-sectional view of the actuator in FIG. 1.

Rotational driving of the rotor 110 about its central axis will be described. Upon exciting the central coil 151 by supplying a driving current to it, an electromagnetic attracting force acts between the eight stator central magnetic poles 141 and six rotor central magnetic poles 121, and a component of the electromagnetic attracting force about the central axis rotationally drives the rotor 110 about the central axis. This will be described in detail with reference to FIG. 4. In the following description, assume that the respective stator central magnetic poles 141 and the corresponding central coils 151 that oppose each other through the rotor 110 are considered to form sets and respectively comprise central coils 151a, 151b, 151c, and 151d, and stator central magnetic poles 141a, 141b, 141c, and 141d, as shown in FIG. 4. To rotate the rotor 110 counterclockwise in FIG. 4, first, a driving current is supplied to the central coil 151a. This exerts an attracting force between a rotor central magnetic pole 121a and the stator central magnetic pole 141a. The rotor central magnetic pole 121a is attracted to the stator central magnetic pole 141a and positioned so that their opposing surfaces overlap. Then, supply of the driving current to the central coil 151*a* is stopped and a driving current is supplied to the central coil 151*d*. This exerts an attracting force between the stator central magnetic pole 141*d* and its nearby rotor central magnetic pole 121*c,* so the two magnetic poles 141*d* and 121*c* attract each other. Consequently, when compared to the state immediately after supplying the driving current to the central coil 151*a,* the rotor 110 rotates counterclockwise by an amount corresponding to the phase difference between the stator central magnetic pole 141*d* and rotor central magnetic pole 121*c.* Subsequently, supply of the riving current to the central coil 151*d* is stopped, and a driving current is supplied to the central coil 151*c.* This rotates the rotor 110 counterclockwise by an amount corresponding to the phase difference between the stator central magnetic pole 141*c* and rotor central magnetic pole 121*c* in the same manner as described above. In this manner, by supplying the driving current in the order of central coil 151*a*→central coil 151*d*→central coil 151*c*→central coil 151*b*→central coil 151*a,* the rotor 110 is rotated counterclockwise in FIG. 4. Similarly, by supplying the driving current in the order of central coil 151*a*→central coil 151*b*→central coil 151*c*→central coil 151*d*→central coil 151*a,* the rotor 110 is rotated clockwise in FIG. 4. By keeping supplying the driving current to any one of the central coils 151*a* to 151*d* finally, the rotational position of the rotor 110 about the central axis is determined.

In this manner, when rotational driving about the central axis is performed by supplying the driving current to the central coils 151, a constant bias current is supplied to the respective central coils 151 and a driving current is superposed on the bias current. Rotational driving about the central axis is effected by magnetic fluxes generated by the driving current supplied to the central coils 151, and the rotor 110 is positioned at a position where the magnetic flux is relatively strong. Consequently, to supply a common constant bias current to the central coils 151 does not interfere with rotational driving about the central axis. In this state, the magnetic flux distribution is generally vertically symmetric, as shown in FIG. 3, and the rotor 110 is positioned at the position shown in FIG. 3.

According to this embodiment, similar attracting forces act between the stator upper magnetic poles 142 and rotor upper magnetic poles 122 and between the stator lower magnetic poles 143 and rotor lower magnetic poles 123, thus imparting the effect of rotational positioning to the magnetic pole surfaces of these poles.

Driving about an axis perpendicular to the central axis will now be described. The upper coil 152 and lower coil 153 wind in the same direction, so as to generate magnetic fluxes in the same directions on supplying currents of the same direction. The magnetic fluxes generated by the upper coil 152 and lower coil 153 do not largely affect rotational driving about the central axis.

For example, in the magnetic pole unit 140A on the right side in FIG. 3, a current having a direction to generate an upward magnetic flux is supplied to the upper coil 152 and lower coil 153. Since the magnetic flux generated by the upper coil 152 is superposed on the magnetic flux generated by the bias current to increase the total magnetic flux, the magnetic flux flowing between the stator upper magnetic pole 142 and rotor upper magnetic pole 122 increases. Since the magnetic flux generated by the lower coil 153 is superposed on the magnetic flux generated by the bias current to decrease the total magnetic flux, the magnetic flux flowing between the stator lower magnetic pole 143 and rotor lower magnetic pole 123 decreases. As a result, the stator upper magnetic pole 142 and rotor upper magnetic pole 122 receive a force that tries to oppose them to each other due to the edge effect between them.

In the magnetic pole unit 140A on the left side in FIG. 3, a current having a direction to generate a downward magnetic flux is supplied to the upper coil 152 and lower coil 153. Contrary to the right side in FIG. 3, the magnetic flux flowing between the stator upper magnetic pole 142 and rotor upper magnetic pole 122 decreases, and the magnetic flux flowing between the stator lower magnetic pole 143 and rotor lower magnetic pole 123 increases. As a result, the stator lower magnetic pole 143 and rotor lower magnetic pole 123 receive a force that tries to oppose them to each other due to the edge effect between them.

Consequently, the rotor 110 is rotated counterclockwise about an axis extending through the center O and perpendicular to the plane of the sheet of drawing.

When supplying currents of the opposite directions to the upper coil 152 and lower coil 153, the rotor 110 is rotated clockwise about the axis extending through the center O and perpendicular to the plane of the sheet of drawing.

Namely, upon supplying currents of the opposite directions to the upper coils 152 and lower coils 153 of one pair of magnetic pole units 140A that oppose each other through the rotor 110, the rotor 110 is rotationally driven about the axis perpendicular to its central axis.

As mentioned above, according to this embodiment, a compact actuator that allows the rotor to be rotationally driven with a multiple-degree freedom and positioned with high accuracy is provided. Since the magnetic pole units for rotational driving with a multiple-degree freedom are arranged outside the rotor, the actuator allows the rotor with the hollow structure to be employed.

Second Embodiment

Figure 5:
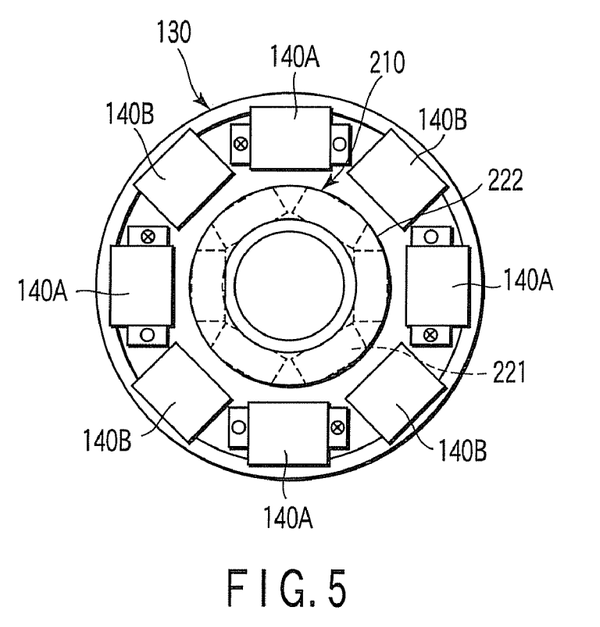
FIG. 5 is a plan view schematically showing an actuator according to the second embodiment.
Figure 6:
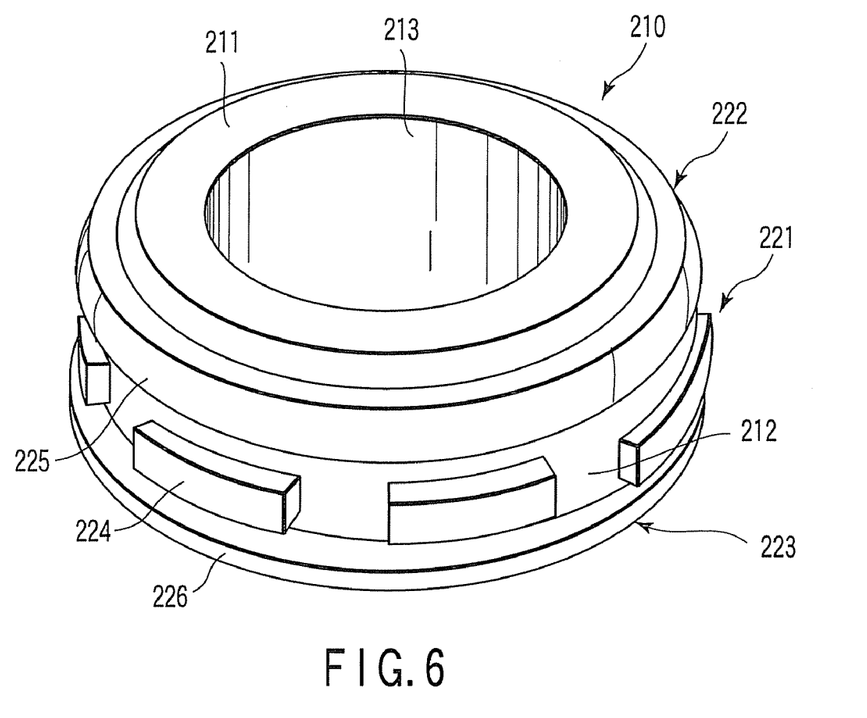
FIG. 6 is a perspective view of the rotor shown in FIG. 5.

The arrangement of an actuator according the second embodiment will be described with reference to FIGS. 5 and 6.

In this embodiment, a rotor 210 has a rotationally symmetric outer shape in the same manner as in the first embodiment. The rotor 210 has a rotor body 211, six magnetized rotor central magnetic poles 221, a single magnetized rotor upper magnetic pole 222, and a single magnetized rotor lower magnetic pole 223. In the same manner as in the first embodiment, the rotor body 211 has a spherical band-like outer surface 212, and a through hole 213 extending along the central axis of the rotor 210. In the same manner as in the first embodiment, the rotor central magnetic poles 221 are arranged on the outer surface 212 of the rotor body 211, along a large circle located on a plane perpendicular to the central axis of the rotor 210.

The rotor upper magnetic pole 222 is arranged on the outer surface 212 of the rotor body 211, along and above the rotor central magnetic poles 221. The rotor lower magnetic pole 223 is arranged on the outer surface 212 of the rotor body 211, along and below the rotor central magnetic poles 221. The rotor central magnetic poles 221, rotor upper magnetic pole 222, and rotor lower magnetic pole 223 respectively have spherical surfaces 224, a spherical surface 225, and a spherical surface 226. Each of the spherical surfaces 224, 225, and 226 is formed of part of a spherical surface concentric with the spherical band-like outer surface 212.

In other words, the rotor upper magnetic pole 222 has such a structure that the rotor upper magnetic poles 122 of the first embodiment are formed integrally and their entire outer surface of the rotor upper magnetic poles 122 is formed of the spherical surface 225 formed of part of a spherical surface concentric with the spherical band-like outer surface 212. Similarly, the rotor lower magnetic pole 223 has such a structure that the rotor lower magnetic poles 123 of the first embodiment are formed integrally and their outer surface of the rotor lower magnetic poles 123 is formed of the spherical surface 225 formed of part of the spherical surface concentric with the spherical band-like outer surface 212.

Regarding the rotational driving method of the rotor 210, the rotor 210 is rotationally driven about the central axis and about the axis perpendicular to the central axis in the same manner as in the first embodiment.

In the first embodiment, the rotor upper magnetic poles 122 and rotor lower magnetic poles 123 align with the rotor central magnetic poles 121 along the central axis of the rotor 110. When performing rotational driving about the axis perpendicular to the central axis, if the stator upper magnetic pole 142 and stator lower magnetic pole 143 to generate the rotational driving force do not respectively oppose the nearly rotor upper magnetic pole 122 and rotor lower magnetic pole 123 about the central axis, the magnetic flux to generate a rotational driving force about the axis perpendicular to the central axis flows between the rotor upper magnetic pole 122 and stator upper magnetic pole 142 and between the rotor lower magnetic pole 123 and stator lower magnetic pole 143 as well, to undesirably generate a rotational driving force about the central axis.

In contrast to this, according to the second embodiment, since each of the rotor upper magnetic pole 222 and rotor lower magnetic pole 223 forms an integral structure, the rotor upper magnetic pole 222 and rotor lower magnetic pole 223 always oppose stator upper magnetic poles 142 and stator lower magnetic poles 143, respectively. Consequently, a magnetic flux to generate a rotational driving force about the axis perpendicular to the central axis does not cause an edge effect between the rotor upper magnetic pole 222 and stator upper magnetic poles 142 and between the rotor lower magnetic pole 223 and stator lower magnetic poles 143, and accordingly does not generate a rotational driving force about the central axis. As a result, the positioning accuracy in rotational driving about the central axis is improved.

Third Embodiment

Figure 7:
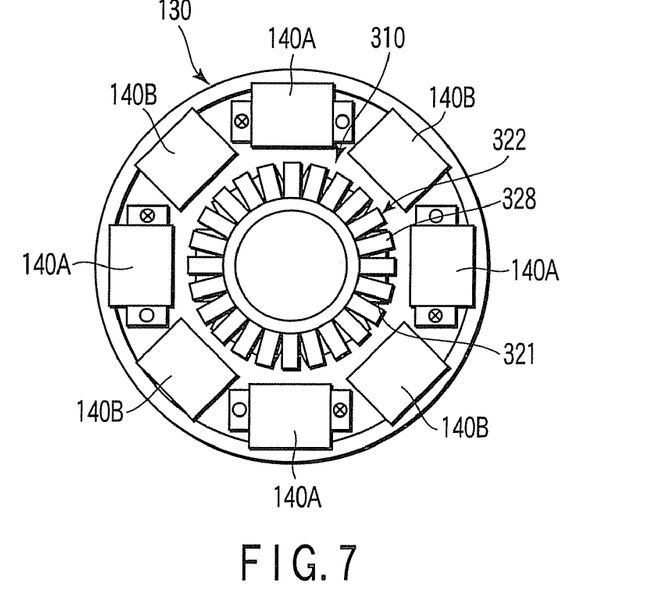
FIG. 7 is a plan view schematically showing an actuator according to the third embodiment.

The arrangement of an actuator according to the third embodiment will be described with reference to FIG. 7.

According to this embodiment, a rotor 310 has a rotationally symmetric outer shape in the same manner as in the first embodiment. The rotor 310 has a rotor body, six magnetized rotor central magnetic poles 321, a magnetized rotor upper magnetic pole 322, and a magnetized rotor lower magnetic pole. The structure of the rotor body is the same as that of the rotor body 111 of the first embodiment. In the same manner as in the first embodiment, the rotor central magnetic poles 321 are arranged on the outer surface of the rotor body, along a large circle located on a plane perpendicular to the central axis of the rotor 310.

The rotor upper magnetic pole 322 is arranged along and above the rotor central magnetic poles 321. The rotor upper magnetic pole 322 comprises magnetic poles 328 of a number obtained by dividing the product of the number of stator central magnetic poles 141 and the number of rotor central magnetic poles 321 by the difference between the number of stator central magnetic poles 141 and the number of rotor central magnetic poles 321. Namely, the rotor upper magnetic pole 322 comprises the magnetic poles 328 of a number expressed as |(n1×n2)/(n2−n2)| where n1 is the number of rotor central magnetic poles 321 and n2 is the number of stator central magnetic poles 141. The rotor upper magnetic pole 322 may be formed as an integral structure of the magnetic poles 328 connected to each other, or the group of magnetic poles 328 fixed to the rotor body.

Although not shown, the rotor lower magnetic pole is arranged along and below the rotor central magnetic poles 321. The rotor lower magnetic pole has the same arrangement as that of the rotor upper magnetic pole 322.

The rotor central magnetic poles 321, the rotor upper magnetic pole 322, and the rotor lower magnetic pole have outer surfaces each formed of part of concentric spherical surfaces.

Regarding rotational driving of the rotor 310, the rotor 310 is rotationally driven about the central axis and about an axis perpendicular to the central axis in the same manner as in the first embodiment.

In the first embodiment, as described above, when performing rotational driving about the axis perpendicular to the central axis, if the stator upper magnetic pole 142 and stator lower magnetic pole 143 that generate the rotational driving force do not oppose the nearly rotor upper magnetic pole 122 and rotor lower magnetic pole 123 about the central axis, a rotational driving force about the central axis is also undesirably generated.

In contrast to this, according to the third embodiment, each of the rotor upper magnetic pole 322 and the rotor lower magnetic pole comprises the magnetic poles 328 of the number described above. Thus, the magnetic pole 328 that is the closest to one of a stator upper magnetic pole 142 and a stator lower magnetic pole 143 about the central axis always opposes one of the stator upper magnetic pole 142 and stator lower magnetic pole 143. The magnetic poles 328 near the closest magnetic pole 328 are located symmetrical with respect to the stator upper magnetic pole 142 and stator lower magnetic pole 143. Consequently, a magnetic flux to generate a rotational driving force about the axis perpendicular to the central axis does not cause an edge effect between the rotor upper magnetic pole 322 and stator upper magnetic pole 142 and between the rotor lower magnetic pole and the stator lower magnetic pole 143, and accordingly does not generate a rotational driving force about the central axis. As a result, the positioning accuracy in rotational driving about the central axis is improved.

Fourth Embodiment

The fourth embodiment provides a camera apparatus formed using an actuator 100 identical to that of the first embodiment. The arrangement of this camera apparatus will be described with reference to FIG. 8.

Figure 8:
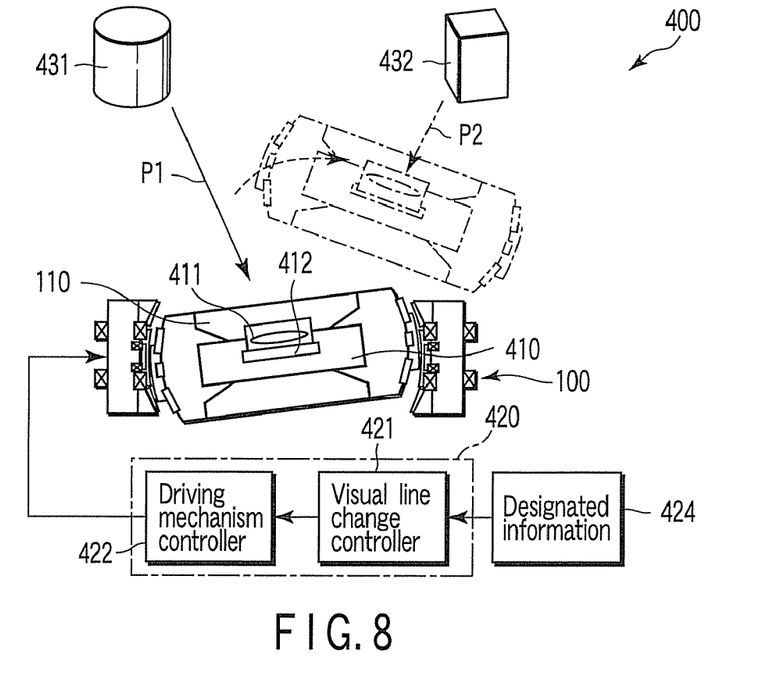
FIG. 8 conceptually shows a camera visual field adjusting apparatus according to the fourth embodiment.

As shown in FIG. 8, a camera apparatus 400 according to this embodiment has the actuator 100, a camera module 410 to pick up the images of objects 431 and 432, and a controller 420 to control the actuator 100. The camera module 410 is mounted on a rotor 110 of the actuator 100. The camera module 410 has a lens 411 to focus object beams emerging from the objects 431 and 432 to form images thereof, and an image sensing element 412 to acquire formed optical images. Since the actuator 100 can rotationally drive the rotor 110 about three axes, the direction of visual line of the camera module 410 can be changed freely. The controller 420 has a visual line change controller 421 to change the direction of visual line of the camera module 410 on the basis of designated information, and a driving mechanism controller 422 to control the actuator 100 on the basis of an operation signal generated by the visual line change controller 421. The controller 420 rotationally moves the rotor 110 on the basis of designated information 424 to change the direction of visual line of the camera module 410, thus adjusting the elevation angle direction, azimuth direction, and rotational angle direction about the axis of visual line of the camera module 410.

The camera module 410 captures the image of the object 431. An object beam P1 from the object 431 is guided to the camera module 410, and focused on the image sensing element 412 by the lens 411 to form the image. When switching the direction of visual line of the camera module 410 from the object 431 to the object 432, the following procedure is followed. The operator supplies the designated information 424 on the object 432. The designated information 424 is information concerning the elevation angle direction, azimuth direction, and rotational angle direction about the axis of visual line of the camera module 410. To change the direction of visual line of the camera module 410, the visual line change controller 421 generates an operation signal to control the actuator 100 on the basis of the designated information 424, and outputs the operation signal to the driving mechanism controller 422. The driving mechanism controller 422 drives the rotor 110 on the basis of the input operation signal. As a result, the direction of visual line of the camera module 410 is switched to the object 432, and the camera module 410 captures the image of the object 432. An object beam P2 from the object 432 is guided to the camera module 410, and is focused on the image sensing element 412 by the lens 411 to form the image.

In the camera apparatus 400 of this embodiment, since the rotor 110 has a hollow structure, the degrees of freedom in the process of wiring to the camera module 410 are large. Since the actuator 100 also has a flat structure, a camera apparatus with a small depth may be provided. When the camera apparatus 400 is employed as a monitor camera apparatus installed on a wall, it looks almost natural.

Fifth Embodiment

The fifth embodiment provides a holographic recording apparatus formed by using an actuator 100 identical to that of the first embodiment. The arrangement of the holographic recording apparatus will be described with reference to FIG. 9.

Figure 9:
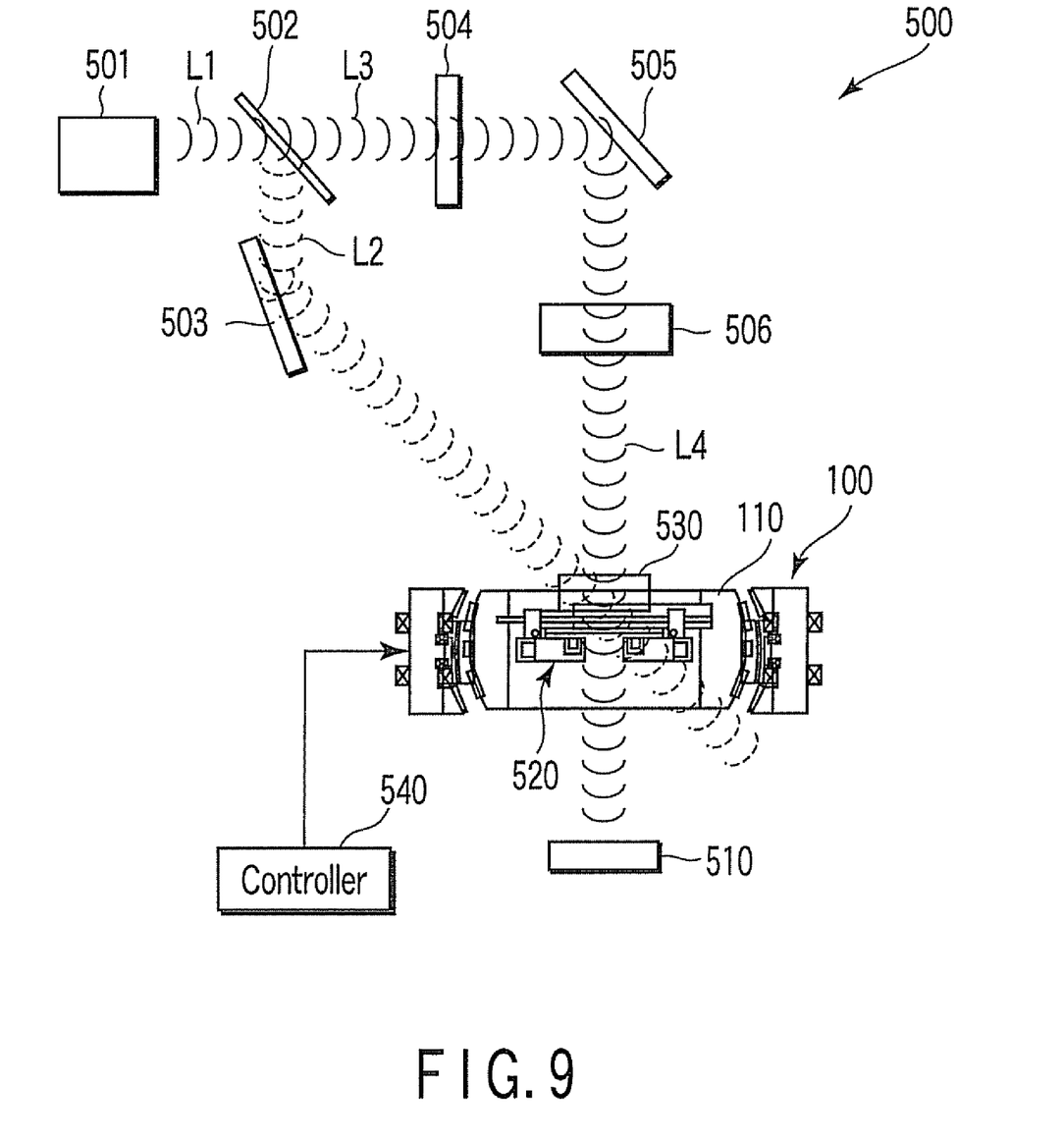
FIG. 9 conceptually shows a holographic recording apparatus according to the fifth embodiment.

As shown in FIG. 9, a holographic recording apparatus 500 according to this embodiment, which is an apparatus to record the interference fringe pattern of light on a recording medium and to reproduce it, includes the actuator 100, an xyz stage 520 held by a rotor 110 of the actuator 100, an optical system to form the interference fringe pattern of reference light and signal light including recorded information onto a recording medium 530 held by the xyz stage 520, and a controller 540 to control the actuator 100. The xyz stage 520 is arranged in a through hole 113 of the rotor 110. The optical system has a light source 501, a beam splitter 502 to split a beam L1 from the light source 501 into two beams L2 and L3, a mirror 503 to direct the beam L2 reflected by the beam splitter 502 toward the recording medium 530 as a reference beam, a shutter 504 to appropriately block the beam L3 transmitted through the beam splitter 502, a mirror 505 to direct the beam L3 passing through the shutter 504 toward the recording medium 530, and a space beam modulator 506 to cause the beam L3 to include the recorded information to generate a beam L4 of the signal light. The xyz stage 520 linearly moves the recording medium 530 by translation in three axes, and the actuator 100 rotationally moves by rotation about three axes. The controller 540 rotationally moves the rotor 110 and linearly moves the xyz stage 520 to adjust the position and posture of the recording medium 530 with respect to the interference fringe pattern. The holographic recording apparatus 500 also has a light detector 510 for reproduction.

In recording, the controller 540 drives the actuator 100 and xyz stage 520 to adjust the recording medium 530 at a desired position with a desired posture (angle). In adjustment of the position and posture (angle), the operator or the like inputs designated information to the controller 540 in advance. The beam splitter 502 splits the beam L1 from the light source 501 into the two beams L2 and L3. The beam L2 is reflected by the mirror 505 as reference light and guided to the recording medium 530. The beam L3 passes through the shutter 504 and is reflected by the mirror 505. The reflected beam L3 is caused to include the recorded information by the space beam modulator 506 to become the beam L4 of the signal light, and guided to the recording medium 530. The beam L2 of the reference light and the beam L4 of the signal light generate an interference fringe pattern. The interference fringe pattern is recorded on the recording medium 530. The incident angle of the beam L2 of the reference light relative to the beam L4 of the signal light is adjusted in advance at a desired angle that allows recording onto the recording medium 530 using the interference fringe pattern of the light.

In reproduction, the shutter 504 is set in a blocking state, and the actuator 100 is controlled to drive the rotor 110, to adjust the recording medium 530 to a desired position with a desired posture (angle) within the information recording region where the information is to be reproduced. Guiding the beam L2 of the reference light to the recording medium 530 causes a change in the beam L2 of the reference light on the basis of the information recorded on the recording medium 530 in advance. The changed light is detected by the light detector 510. The signal detected by the light detector 510 is reproduced to the original information through a predetermined procedure.

In general, the multiplex recording method in the holographic recording apparatus includes angles multiplex recording of recording by changing the posture (angle) of the recording medium 530, and shift multiplex recording of recording by shifting the position of the recording medium 530. To increase the capacity of recorded information by multiplex recording, an improvement in functions and performance of a driving mechanism to drive the recording medium 530 is strongly demanded. Namely, both multiple-degree-freedom driving of the recording medium 530, and an increase in accuracy, an increase in speed, a lower profile, and a smaller size of the driving mechanism are required simultaneously.

The holographic recording apparatus 500 of this embodiment achieves multiple-degree-freedom driving of the recording medium 530 and weight reduction of the rotor 110 including the recording medium 530 and xyz stage 520, allowing expectation for a higher speed and higher accuracy. Consequently, the driving control characteristics in multiplex recording and reproduction of the holographic recording apparatus are improved largely. This allows expectation for a larger capacity in multiplex recording and a higher data transfer rate, and achieves a lower profile and smaller size in the entire holographic recording apparatus as a whole. Since the rotor 110 has a hollow structure not to interfere with the optical path of the reference light, the holographic recording apparatus 500 is suitable for reproduction using a small number of components.

This embodiment has been described using only main constituent elements such as the light source 501 and space beam modulator 506. The actual holographic recording apparatus is used with addition of constituent elements as needed, such as a lens or polarizing plate that are required in normal optical design.

Although the embodiments of the present invention have been described with reference to the accompanying drawing, the present invention is not limited to these embodiments, but various changes and modifications may be made within the spirit or scope of the gist of the invention.

In the above embodiments, the rotor 110 has the six rotor central magnetic poles 121, and the stator 130 has the eight stator central magnetic poles 141. However, the present invention is not limited to this. The rotor 110 suffices if it has at least two rotor central magnetic poles 121, and the stator 130 suffices if it has stator central magnetic poles 141 that are larger in number than the rotor central magnetic poles 121. Although the stator 130 has the four stator upper magnetic poles 142 and four stator lower magnetic poles 143, the present invention is not limited to this. The stator 130 suffices if it has at least three stator upper magnetic poles 142 and at least three stator lower magnetic poles 143. Although each of the number of stator upper magnetic poles 142 and the number of stator lower magnetic poles 143 is half that of the stator central magnetic poles 141, this arrangement is not always necessary. For example, each of the number of stator upper magnetic poles 142 and the number of stator lower magnetic poles 143 may be the same as that of the stator central magnetic poles 141.

Additional advantages and modifications will readily occur to those skilled in the art. Accordingly, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. An actuator comprising:
    a rotor having a rotationally symmetric outer shape, the outer shape partially including a first spherical surface, the rotor including
        magnetized rotor central magnetic poles arranged along a circumference formed when a plane extending through a center of the first spherical surface and perpendicular to a central axis of the rotor intersects the first spherical surface, the rotor central magnetic poles having outer surfaces arranged on the first spherical surface,
        a magnetized rotor upper magnetic pole arranged along and above the rotor central magnetic poles, the rotor upper magnetic pole having an outer surface arranged on the first spherical surface, and
        a magnetized rotor lower magnetic pole arranged along and below the rotor central magnetic poles, the rotor lower magnetic pole having an outer surface arranged on the first spherical surface;
    a stator having a rotationally symmetric space to contain the rotor, the space having a boundary partially including a second spherical surface concentric with the first spherical surface, the stator including
        stator central magnetic poles that are arranged around the rotor to oppose the rotor central magnetic poles and larger in number than the rotor central magnetic poles, the stator central magnetic poles having inner surfaces arranged on the second spherical surface,
        at least three stator upper magnetic poles arranged above the rotor central magnetic poles, the stator upper magnetic poles having inner surfaces arranged on the second spherical surface,
        at least three stator lower magnetic poles arranged below the rotor central magnetic poles, the stator lower magnetic poles having inner surfaces arranged on the second spherical surface,
        central coils to appropriately magnetize the stator central magnetic poles,
        upper coils to appropriately magnetize the stator upper magnetic poles, and
        lower coils to appropriately magnetize the stator lower magnetic poles; and
    a bearing that is arranged between the rotor and the stator to support the rotor to be rotatable with respect to the stator about a central axis of the rotor and an axis perpendicular to the central axis,
    a length of each of the stator central magnetic poles along a central axis of the stator being larger than a length of each of the rotor central magnetic poles along the central axis of the rotor, an open angle of two straight lines drawn from a center of the first spherical surface to an upper end of each of the stator upper magnetic poles and a lower end of a corresponding one of the stator lower magnetic poles being larger than an open angle of two straight lines drawn from the center of the first spherical surface to an upper end of each of the rotor upper magnetic poles and a lower end of a corresponding one of the rotor lower magnetic poles, and an open angle of two straight lines drawn from the center of the first spherical surface to a lower end of each of the stator upper magnetic poles and an upper end of a corresponding one of the stator lower magnetic poles being larger than an open angle of two straight lines drawn from the center of the first spherical surface to a lower end of each of the rotor upper magnetic poles and an upper end of a corresponding one of the rotor lower magnetic poles.

2. The actuator according to claim 1, wherein the rotor has a through hole extending through the central axis thereof.

3. The actuator according to claim 1, wherein the rotor upper magnetic pole comprises first magnetic poles corresponding in number to the rotor central magnetic poles, the rotor lower magnetic pole comprises second magnetic poles corresponding in number to the rotor central magnetic poles, and the first and second magnetic poles align with the rotor central magnetic poles along the central axis of the rotor.

4. The actuator according to claim 1, wherein each of the rotor upper magnetic pole and the rotor lower magnetic pole comprises a single magnetic pole.

5. The actuator according to claim 1, wherein each of the rotor upper magnetic pole and the rotor lower magnetic pole comprises magnetic poles of a number obtained by dividing a product of the number of the stator central magnetic poles and the number of the rotor central magnetic poles by a difference between the number of the stator central magnetic poles and the number of the rotor central magnetic poles.

6. A camera apparatus comprising:
    the actuator according to claim 1;
    a camera module mounted on the rotor of the actuator to capture an image of an object; and a controller to control the actuator to rotationally move the rotor on the basis of designated information, thereby changing a direction of visual line of the camera module.

7. The holographic recording apparatus to record an interference fringe pattern of light on a recording medium, comprising:

the actuator according to claim 1;

an xyz stage provided to the rotor of the actuator to hold the recording medium;

an interference optical system to form an interference fringe pattern of reference light and information light including recorded information onto the recording medium; and a controller to control the actuator and the xyz stage to adjust a position and a posture of the recording medium with respect to the interference fringe pattern.

* * * * *